US010133778B2

(12) United States Patent
Lee et al.

(10) Patent No.: US 10,133,778 B2
(45) Date of Patent: Nov. 20, 2018

(54) QUERY OPTIMIZATION USING JOIN CARDINALITY

(71) Applicant: SAP SE, Walldorf (DE)

(72) Inventors: Taehyung Lee, Seoul (KR); Joo Young Yoon, Gyeonggi-do (KR); Sang Il Song, Seoul (KR); Yongsik Yoon, Walldorf (DE); Sung Heun Wi, Seongnam (KR); Junhee Woo, Gyeonggi-do (KR)

(73) Assignee: SAP SE (DE)

( * ) Notice: Subject to any disclaimer, the term of this patent is extended or adjusted under 35 U.S.C. 154(b) by 379 days.

(21) Appl. No.: 14/947,252

(22) Filed: Nov. 20, 2015

(65) Prior Publication Data

US 2017/0147644 A1 May 25, 2017

(51) Int. Cl.
*G06F 17/30* (2006.01)

(52) U.S. Cl.
CPC ........ *G06F 17/30466* (2013.01); *G06F 17/30* (2013.01)

(58) Field of Classification Search
CPC .................... G06F 17/30466; G06F 17/30454
USPC .................................................. 707/714, 718
See application file for complete search history.

(56) References Cited

U.S. PATENT DOCUMENTS

| 6,298,342 | B1 * | 10/2001 | Graefe | G06F 17/30595 |
| | | | | 707/602 |
| 6,513,029 | B1 * | 1/2003 | Agrawal | G06F 17/30321 |
| 9,727,609 | B2 * | 8/2017 | Su | G06F 17/30466 |
| 9,984,116 | B2 * | 5/2018 | Rais Ghasem | G06F 17/3043 |
| 2004/0139061 | A1 * | 7/2004 | Colossi | G06F 17/30592 |
| 2006/0085437 | A1 * | 4/2006 | Brodhun | G06F 17/30604 |
| 2007/0027860 | A1 * | 2/2007 | Bestgen | G06F 17/30433 |
| 2008/0140696 | A1 * | 6/2008 | Mathuria | G06F 17/30315 |
| 2009/0070315 | A1 * | 3/2009 | Ahmed | G06F 17/30492 |
| 2009/0292669 | A1 * | 11/2009 | Ahmed | G06F 17/30466 |
| 2011/0137890 | A1 * | 6/2011 | Bestgen | G06F 17/30466 |
| | | | | 707/719 |
| 2014/0101129 | A1 * | 4/2014 | Branish, II | G06F 17/30893 |
| | | | | 707/714 |
| 2015/0339349 | A1 * | 11/2015 | Ahmed | G06F 17/30489 |
| | | | | 707/714 |
| 2016/0012184 | A1 * | 1/2016 | Nimmagadda | G06F 19/322 |
| | | | | 705/3 |
| 2016/0179869 | A1 * | 6/2016 | Hutchins | G06F 17/30371 |
| | | | | 707/703 |

(Continued)

*Primary Examiner* — Cam Linh T Nguyen
(74) *Attorney, Agent, or Firm* — Sterne, Kessler, Goldstein & Fox, P.L.L.C.

(57) ABSTRACT

Disclosed herein are system, method, and computer program product embodiments for utilizing join cardinality to improve the performance of query processing. An embodiment operates by a database engine receiving a query including a join operation on a first and a second table using a join predicate, and a tag for the join operation indicating a cardinality relationship between the first and the second table when satisfying the join predicate. Then, the database engine generates a query processing plan for performing the query. For the join operation, the database engine selects one of the first or the second tables to remove from the join operation based on a type of the join operation and the tag. Based on the selecting, the database engine may remove may the join operation and the selected table from the query processing plan.

20 Claims, 7 Drawing Sheets

(56) References Cited

U.S. PATENT DOCUMENTS

2016/0371329 A1* 12/2016 Bensberg .......... G06F 17/30463

* cited by examiner

OPTIMIZATION CRITERIA

| LEFT PART \ RIGHT PART | MANY | ONE | EXACT ONE |
|---|---|---|---|
| MANY | | LEFT OUTER JOIN (right child) | LEFT OUTER JOIN (right child), INNER JOIN (right child) |
| ONE | RIGHT OUTER JOIN (left child) | LEFT OUTER JOIN (right child), RIGHT OUTER JOIN (left child) | LEFT OUTER JOIN (right child), RIGHT OUTER JOIN (left child), FULL OUTER JOIN (right child), INNER JOIN (right child) |
| EXACT ONE | RIGHT OUTER JOIN (left child), INNER JOIN (left child) | LEFT OUTER JOIN (right child), RIGHT OUTER JOIN (left child), FULL OUTER JOIN (left child), INNER JOIN (left child) | LEFT OUTER JOIN (any child), RIGHT OUTER JOIN (any child), FULL OUTER JOIN (any child), INNER JOIN (any child) |

400

LEGEND
JOIN OPERATOR (target child)

QUERY OPTIMIZATION USING JOIN CARDINALITY

BACKGROUND

A typical database system includes a database, such as a relational database, for storing and organizing data into one or more tables. Users of the database may send queries to the database system to retrieve data from more than one table according to specified criteria. Conventionally, a query may include a join operation that specifies a rule for combining two or more tables. But not every joined table is necessarily used by the database system to produce a result of the query. Therefore, a typical database system is inefficient because it may perform unnecessary joins, increasing query processing time and complexity.

BRIEF DESCRIPTION OF THE DRAWINGS

The accompanying drawings are incorporated herein and form a part of the specification.

FIG. 4 illustrates a table of optimization criteria and associated target child nodes, according to an example embodiment.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for utilizing join cardinality information to improve the performance of query processing. In an embodiment, a database management system (DBMS) provides a client with the capability to tag a join operation with cardinality information. The DBMS receives a query including the join operation between a first and a second table and including a tag for the join operation specifying cardinality information. Based on the received query, the DBMS generates a query processing plan for performing the query including the join operation. Based on the type of the join operation and the tag, the DBMS may select one of the first or the second tables to remove from the join operation of the query processing plan. Then, the DBMS may simplify the query processing plan by removing the join operation and the selected table from the query processing plan. As part of generating a query execution plan, the DBMS may use the simplified query processing plan. The DBMS then executes the query execution plan to produce a result of the query back to the client.

Figure 1:
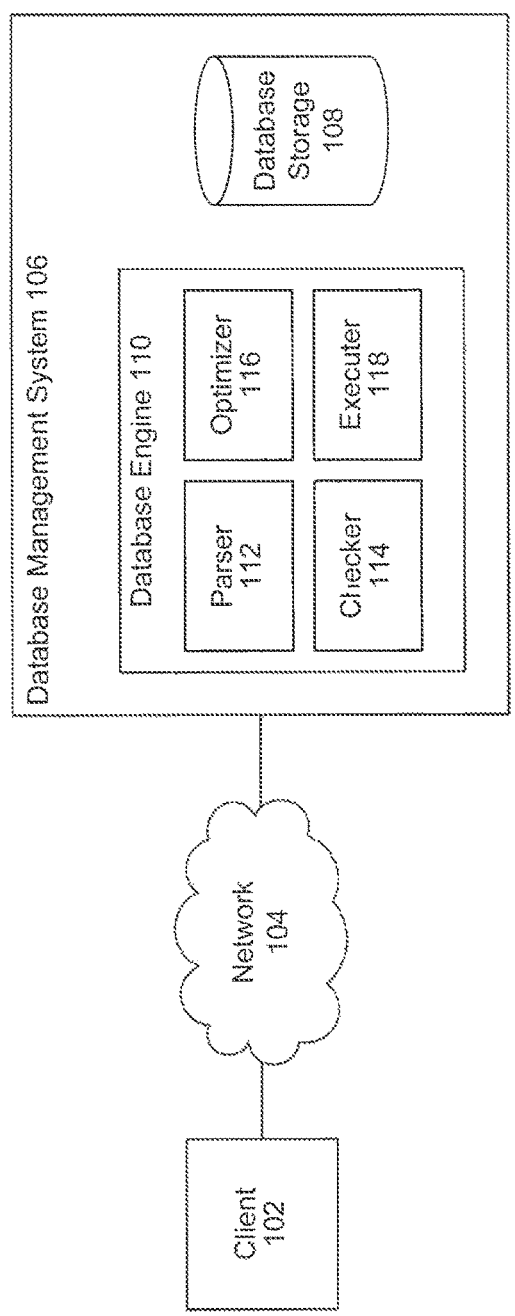
FIG. 1 is a block diagram illustrating a system for improving the performance of join queries, according to an example embodiment.

FIG. 1 is a block diagram illustrating a system 100 for improving the performance of join queries, according to an example embodiment. System 100 includes client 102 that communicates with DBMS 106 over network 104. Network 104 may be, for example, a LAN (Local Area network), MAN (metropolitan area network), WAN (Wide Area Network) such as the Internet, or any combination thereof. Network 104 may further utilize Ethernet communications, although other wired and/or wireless communication techniques, protocols and technologies can be used.

Client 102 may be any computing device capable of connecting to network 104. For example, a computing device may be a laptop, a desktop computer, or a mobile device (e.g., a mobile phone). Client 102 may be used by a user to access an application for communicating with DBMS 106 to, for example, retrieve data from database storage 108 of DBMS 106.

Data stored in database storage 108 is commonly organized in the form of tables, each table having a number of rows and columns (i.e., fields). Each row in a table generally has a data value associated with each column of the table. This intersection between one row and one column is commonly referred to as a cell. To access data from database storage 108, client 102 typically issues a request DBMS 106 in the form of a query.

A query may include two types of criteria: a projection and a selection. The projection refers to one or more columns that are of interest to the user such that only the specified column(s) of the projection are examined in producing a result of the query. The selection refers to one or more conditions indicating which rows to be returned from the query. For example, a condition commonly involves comparing the values of cells in a column to some other value to determine whether the row associated with the compared cell satisfies the condition and should be returned. The query may be specified in a database manipulation language, such as Structured Query Language (SQL). SQL is well known and is described in many publicly available documents, including "Information Technology—Database languages—SQL," published by the American National Standards Institute as American National Standard ANSI/ISO/IEC 9075: 1992. Although the following embodiments may be described with respect to SQL query statements, a skilled artisan would recognize that described embodiments are equally applicable to query statements specified in other database manipulation languages.

To improve the usability and efficiency of a database, database storage 108 often stores related data in multiple separate tables. Therefore, a user often needs to retrieve related data from two or more tables. In an embodiment, a query may include a join operation that specifies a condition for combining rows from at least two tables based on a column common to each of the tables. A join query (using SQL) may follow the following format: SELECT [Projection] FROM Table1 [Join Type] JOIN Table2 ON [Join predicate]. The join operation, "JOIN," may be further specified by a join type, [Join Type].

As described above, the [Projection] may refer to one or more columns from joined tables, (e.g., Tables 1 and 2), that are of interest to the user. The [Join predicate] (i.e., join predicate) may refer to operations on one or more columns from each table to determine how to combine the tables. For example, a [Join predicate] may be "Table1.a=Table2.a" such that the [Join predicate] is satisfied for a row from Table 1 when the row's cell value corresponding to the column "Table1.a" matches a cell value corresponding to the column "Table2.a" for a row from Table 2. Finally, [Join Type] may be a join operation of a specific type. Common types of join operations include inner joins, outer joins, and cross joins, each of which is explained below.

Inner join: creates a new result table by combining column values of rows from each table, (e.g., Tables 1 and 2), when the combined rows satisfy the [Join predicate]. For example, when the [Join predicate] is "Table1.a=Table2.a," DBMS 106 compares each row of "Table 1" with each row of "Table 2" to find all pairs of rows having matching values between columns "Table1.a" and "Table2.a." When the [Join predicate] is satisfied by matching non-NULL values, column values for each matched pair of rows of each table are combined into a result row of the result table.

Outer join: creates a new result table that does not require each row in the joined tables to satisfy the [Join predicate], e.g., having a matching row for the joined columns "Table1.a" and "Table2.a." The result table may retain each row from one or more joined tables even if no other matching row exists. The result table further combines columns from Tables 1 and 2 when respective rows satisfy the [Join predicate], e.g., match each other. Outer joins may include left outer joins, right outer joins, and full outer joins, each dictating which table's rows are retained (left, right, or both, respectively). For example, in a left outer join, a created result table returns all rows from the left table and the matched rows from the right table. In a right outer join, a created result table may return all rows from the right table and the matched rows from the left table. And a full outer join may return all rows from both tables and combine the columns of corresponding rows that satisfy the [Join predicate].

Cross join: creates a new result table that is the Cartesian product of rows from each table, (e.g., Tables 1 and 2), combined by the join operation. In other words, it will produce rows which combine each row from the "Table 1" with each row from "Table 2." Therefore, if "Table 1" has n-rows and "Table 2" has m-rows, the resulting table will have n×m rows.

In an embodiment, client 102 tags a join operation, i.e., "JOIN," on a first table and a second table with one of several cardinalities. The join operation may be of a specific type, [Join Type]. In data modeling systems, a cardinality may refer to a relationship specifying a uniqueness of matches between the first and second tables on one or more specified or joined columns. In an embodiment, the cardinality tag may include a first part and a second part. For the one or more joined columns, the first part may specify a cardinality of the first table with respect to the second table and the second part may specify a cardinality of the second table with respect to the first table. For example, database storage 108 may store a first table, "Patients" with attributes (PATIENT_ID, NAME, AGE, . . . , NATION_ID), and a second table, "Nations" with attributes (NATION_ID, NATION_NAME, . . . , NATION_CAPITAL). The two tables may be joined on the "NATION_ID" fields by the following join predicate, "Patients.NATION_ID=Nations.NATION_ID." In this example, the join operation may have a cardinality that is "MANY-TO-EXACT ONE" because each patient has exactly one nationality (assuming that multiple-citizenship is not recognized). But, multiple patients may have the same nationality.

In an embodiment, client 102 may specify a tag part with one of the following options: "ONE," "EXACT ONE," or "MANY." Since each of the two tag parts may be specified as one of the three options, there may be nine unique possible cardinality tags. In other embodiments, there may be more or less tag part options. Further to the example format for a join query, a query having a tagged join operation may be specified in the following example format: SELECT [Projection] FROM Table1 [Join Type] [Cardinality Tag] JOIN Table2 ON [Join predicate]. In an embodiment, [Cardinality Tag] may be specified as: [First Part] TO [Second Part].

A specified [First Part] may indicate a uniqueness of a matching row from Table 1 with respect to Table 2 that satisfies the [Join predicate], e.g., "Table1.a=Table2.a." Therefore, for any row in "Table 2":

[First Part] being "ONE" indicates that there exists at most one row from "Table 1" such that the [Join predicate] is satisfied;

[First Part] being "EXACT ONE" indicates that there exists exactly one row from "Table 1" such that the [Join predicate] is satisfied; and

[First Part] being "MANY" indicates that there may exist any number of rows from "Table 1" such that the [Join predicate] is satisfied.

Similarly, a specified [Second Part] may indicate a uniqueness of a matching row from "Table 2" with respect to "Table 1" that satisfies the [Join predicate], e.g., "Table1.a=Table2.a." For example, for any row in Table 1, [Second Part] being "ONE" indicates that there exists at most one row from "Table 2" such that the [Join predicate] is satisfied.

DBMS 106 includes database storage 108 for storing data and database engine 110 for operating on the stored data. Database storage 108 may be a relational database including one or more tables for storing related data. In an embodiment, for each join operation of a join query, DBMS 106 provides client 102 with the capability to specify an associated cardinality tag. By specifying information describing the cardinality between tables joined on the [Join predicate], client 102 provides DBMS 106, i.e., database engine 110, with additional information for improving the performance of query processing. Specifically, database engine 110 reduces the time needed by DBMS 106 to produce a result of the query.

In an embodiment, DBMS 106 includes one or more processors for implementing various components of database engine 110. For ease of understanding, descriptions of the components of database engine 110 may refer to FIG. 2, which is a diagram 200 illustrating intermediate join optimization results and steps for an example query, according to an example embodiment. Database engine 110 may include the following components: parser 112, checker 114, optimizer 116, and executer 118. A component (or module) of database engine 110 may include a selection of stored operations that when executing in the one or more processors causes the one or more processors to perform the operations of the component.

Parser 112 may receive a query request from client 102 via network 104. For example, the query request may be query 202 from FIG. 2. As shown, a query request, such as query 202, may include more than one join operations.

Figure 2:
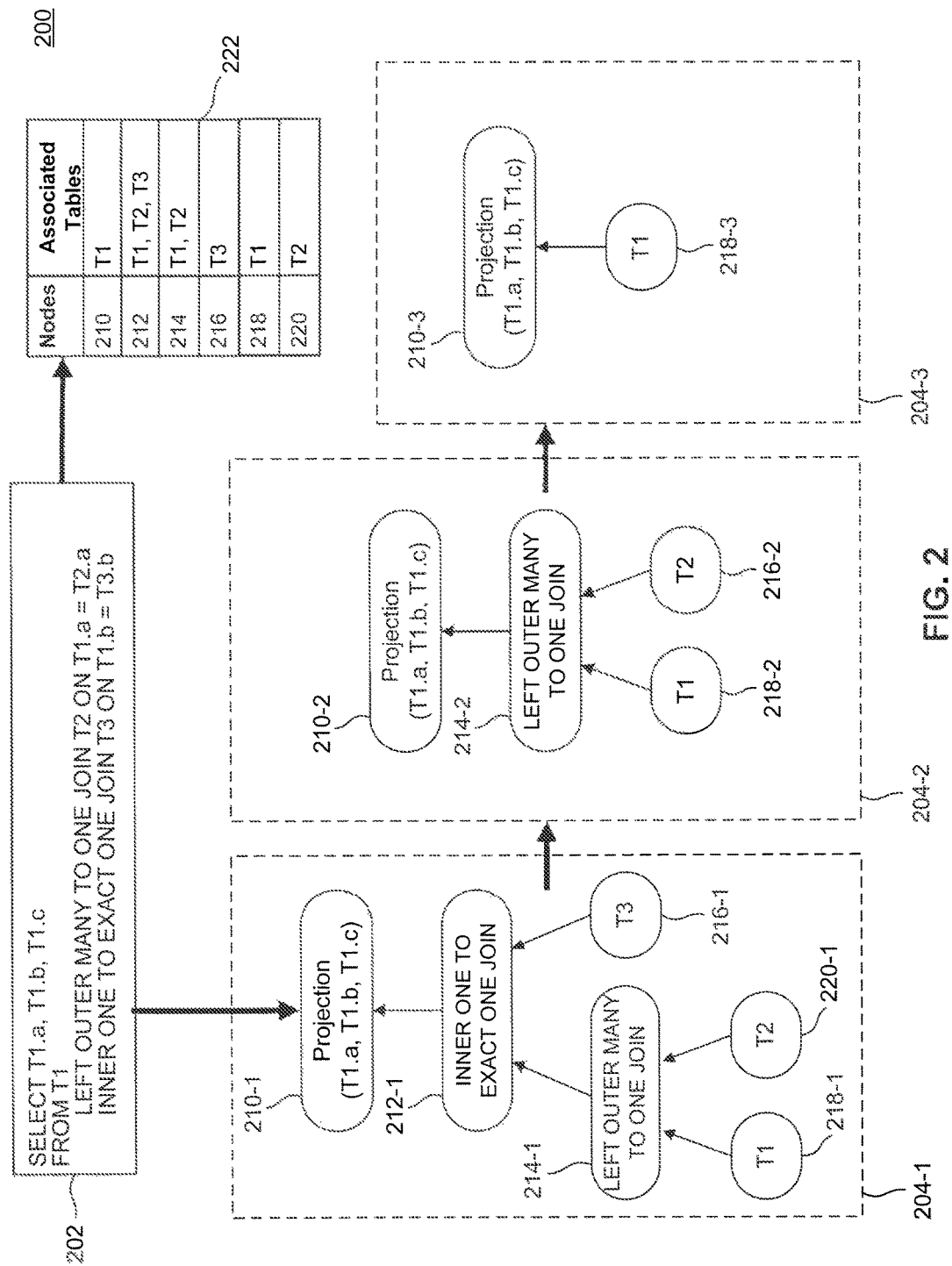
FIG. 2 is a diagram illustrating intermediate join optimization results for an example query, according to an example embodiment.

As depicted in FIG. 2, the projection of query 202 refers to columns "a," "b," and "c" of table "T1." Table "T1" is requested to be left outer joined with table "T2" based on matching column "a" of table "T1" with column "a" of table "T2." Likewise, the resulting table of the left outer join is requested to be inner joined with table "T3" based on matching column "a" of table "T1" with column a of table "T3." In this example, there is no specified selection, i.e., there is no "WHERE" clause specifying other conditions for returned rows.

Upon receiving the query, parser 112 may parse the query and transform the received query into a relational algebraic representation, such as a parse tree. The parse tree may be an example internal logical structure used by database engine 110 to reduce query processing time. As part of producing the parse tree, parser 112 may check the validity of the query statement's syntax. In an embodiment, during parsing, for a node of the parse tree, parser 112 may associate relevant tables with the node. For example, as shown in relations table 222 of FIG. 2, node 210 representing the projection "T1.a, T2.a, T1.c" may be associated with T1. In contrast, node 214 representing the "LEFT OUTER JOIN" operator associated with the "MANY TO ONE" cardinality tag may be associated with tables "T1" and "T2." This is because node 214 joins on nodes 218 and 220, representing tables T1 and T2, respectively. In an embodiment, each referenced table in the query may be assigned a unique identification (ID) and the relations table 222 may associate each node with the unique IDs.

In an embodiment, checker 114 may check semantics of the produced parse tree. For example, checker 114 verifies that each specified object (e.g., table "T1" or column "T1.a") of the parse tree exists and is referenced properly. Checker 114 may further validate access permissions related to whether client 102 may access specified tables, columns, or rows of database storage 108. Upon verification, checker 114 may link each object to the corresponding database element in database storage 108. Checker 114 may also, for example, resolve data types of referenced objects. In an embodiment, checker 114 may instead or cooperate with parser 112 to complete the relations table 222.

In an embodiment, optimizer 116 receives a modified parse tree from checker 114. Depending on optimization heuristics and information from the received modified parse tree, optimizer 116 is configured to generate one or more query processing plans. Each plan may represent a sequence of logical steps for producing a result of the query. Optimizer 116 may select a query processing plan having a minimized execution cost, i.e., minimum processing time, and/or improve the performance of a selected query processing plan to generate a query execution plan. The execution plan may be a query processing plan with optimized join operations. For example, query processing plan 204-1 of FIG. 2 represents a possible generated query processing plan for calculating a result of query 202.

As shown, a query processing plan (e.g., query processing plan 204-1) may be represented as a binary tree having multiple nodes (e.g., nodes 210-220). Nodes may include a root node (i.e., a node having no parent), a leaf node (i.e., a node having no children), or an internal node (i.e., a node having at least one child). For example, node 210 may be a root node of the binary tree because node 210 does not reference a parent node. Node 210 may represent or contain the projection of query 202. As shown, the projection includes columns "a," "b," and "c" of table "T1." Node 212 may be an internal node because node 212 references at least one child node, i.e., node 212 has nodes 214 and 216 as its children. Node 212, in an example, contains or represents the tagged join operation "INNER ONE TO EXACT ONE JOIN." Finally, node 216 may be a leaf node because node 216 has no children. Node 216 may represent table "T3." In computer science terminology, a level of a node may refer to the number of connections or edges along a unique path from the node to the root node. For example, node 210, which is a root node, is at level 0, while node 218 is at level 3. An ancestor of a node is any node along the unique path from the node to the root node. For example, a parent node 214 of node 220 is also an ancestor node. Conversely, node 220 is a descendent of its parent node 214. A descendent of a node is any node reachable from the node going away from the root node toward any leaf nodes.

In an embodiment, for each join operation of a query, optimizer 116 may determine whether that join operation is unnecessary based on a type of that join operation and the cardinality tag specifying a uniqueness relationship between the joined tables. As depicted in query processing plan 204-1, tables to be joined may include tables "T1" and "T2" representing nodes 218-1 and 220-1, respectively. The tables to be joined may also include a resulting table of a join operation, such as "LEFT OUTER MANY TO ONE JOIN" represented by node 214-1 that is joined with table "T3" represented by node 216-1. In an embodiment, optimizer 116 may first check whether a join operation is tagged by cardinality information before proceeding with any optimization using join cardinality.

As part of determining whether a join operation may be unnecessary in a query processing plan, optimizer 116 may use a type of that join operation and its cardinality tag to determine whether one of the two tables to be joined does not need to be joined. In the context of a query processing plan, optimizer 116 may determine whether one of the join operation node's two children nodes does not need to be joined. A child node (or table) to be joined may be unnecessary if omitting the join operation and that child node does not affect the result of the query processing plan. To determine a target child node that may possibly be removed, optimizer 116 compares the join operation type and the first and second parts of the cardinality tag with programmed optimization criteria. If the optimization criteria matches the join operation type and its cardinality tag, optimizer 116 may determine a target child node for possible removal. In an embodiment, optimizer 116 may verify that the target child node may be removed without changing the result of the query processing plan. Upon successfully verifying that the result of the query processing plan does not change, optimizer 116 may remove the join operation node and the target child node from the query processing plan to minimize query processing time.

FIG. 4 illustrates a table 400 of optimization criteria and associated target child nodes, according to an example embodiment. In an embodiment, optimizer 116 from FIG. 1 may compare a type of the join operation and the join operation's cardinality tag with the optimization criteria depicted in table 400 to determine a target child node of a query processing plan that may possibly be removed. In an embodiment, optimization criteria needed to determine a target child node for removable (if any) includes the specific type of join operation and the first and second parts of the cardinality tag.

For example, for the tagged join operation of the right outer join type, "RIGHT OUTER EXACT ONE TO MANY JOIN," optimizer 116 may use the first/left part, "EXACT ONE," and the second/right part, "MANY," of the cardinality tag to first determine whether the join operation, "RIGHT OUTER JOIN," may possibly be optimized. As depicted in the intersection cell between "EXACT ONE" and "MANY," "RIGHT OUTER JOIN" may possibly be optimized. The "RIGHT OUTER JOIN" in the intersection cell further indicates that the left child is a target child node that may possibly be removed. If the specific type of the join operation cannot be matched, i.e., that join type is not present in the specific cell of table 400, then that join operation cannot be optimized using the information specified in the cardinality tag. As shown in the intersection cell between "EXACT ONE" and "EXACT ONE," the target child for four types of join operations may be either the left or right child, i.e., "any child."

A skilled artisan may recognize that the target child may be algorithmically determined using various logical statements or data structures. For example, in an embodiment, optimizer 116 may include a series of comparison logical statements, such as if-else statements, to check for whether the optimization criteria is met. In an embodiment, optimizer 116 may utilize a lookup table storing associations between a tagged join operation and a target child node. For example, optimizer 116 might look up the tagged join operation "INNER EXACT ONE TO ONE JOIN" to retrieve the left child as the target child node.

Returning to FIG. 2, optimizer 116 may use the optimization criteria depicted in FIG. 4 to determine whether each join operation of query 202 may be optimized. Query processing plans 204-1 may be a query processing plan to be join-optimized by optimizer 116. Query processing plan 204-1 may be generated from query 202. In an embodiment, optimizer 116 may iteratively perform the join optimization for each join operation from the root node towards the leaf nodes. This optimization approach is a top-down approach where optimizer 116 priorities determining whether to prune join operations nodes that are closer to the root node. Therefore, optimizer 116 may first attempt to optimize a join operation node, (e.g., node 212-1), that is closest to the root node. If node 214-1 was not pruned, optimizer 116 may then attempt to optimize node 214-1, which is the next join operation node closest to the root node.

Each successive query processing plan 204-*n*+1 of a query processing plan 204-*n* may represent a result of performing the join optimization on a remaining join operation node of query processing plan 204-*n*. In query processing plan 204-1, optimizer 116 may determine whether to optimize the join operation node 212-1. As discussed with regards to FIG. 4, for the tagged join operation "INNER ONE TO EXACT ONE JOIN" represented by node 212-1, optimizer 116 may determine that the right child is the target child that may be possibly removed. As shown in FIG. 2, the right child of node 212-1 is node 216-1 representing table "T3." Next, optimizer 116 may verify that removing or pruning node 216-1 from query processing plan 204-1 will not affect a result of query 202. To make this verification, in an embodiment, optimizer 116 may determine whether the projection of query 202 includes any table accessed by the target node, node 216-1, or any of its descendent nodes. Here, table "T3" is not accessed by the projection specifying columns "a," "b," and "c" of table "T1." Therefore, node 216-1 may not need to be joined to node 214-1 to produce a result of query 202 and optimizer 116 may prune both the join operation node, node 212-1, and the right child node, node 216-1.

In an embodiment, optimizer 116 may make the above verification by iterating from the parent node (node 210-1) of the join operation node 212-1 towards the root node (node 210-1) to check that no ancestor of the join operation node 212-1 references the target child node 216-1 or any of its descendants. In this example, the root node 210-1 is the only ancestor of join operation node 212-1, so optimizer 116 checks whether the root node 210-1 accesses table "T3" of the child node 216-1. Since the projection does not refer to table "T3," no ancestor node of target child node 216-1 needs information from the target child node 216-1 to produce a result of query 202. In an embodiment, an ancestor node may access or reference a target child node if a projection, selection, or join predicate of the ancestor node refers to the target child node or any of its descendant nodes.

In an embodiment, optimizer 116 may reference a relations table, such as relations table 222, to determine what types of data, e.g., tables, may be associated with or provided by a target child node. For example, if a target child node is node 216-1, optimizer 116 may lookup node 216 in relations table 222 to determine that table "T3" is associated with node 216. In another example, if the target child node is node 214, optimizer 116 may determine the associated tables "T1" and "T2" from relations table 222. In an embodiment, optimizer 116 may instead iterate from the target child node toward its descendent nodes to determine associated tables.

Query processing plan 204-2 shows the result of the first join-optimization of join operation node 212-1. As depicted, nodes 212-1 and 216-1 have been pruned. A simplified query processing plan including nodes 210-2, 214-2, 216-2, and 218-2 remains. Optimizer 116 may determine the next join operation node to perform the join optimization. With respect to query processing plan 204-2, the next join operation node is join operation node 214-2. Similarly to the join optimization performed for node 212-1, optimizer 116 may determine that node 216-2 is a target child node for removal using optimization criteria information from FIG. 4. Again, the projection includes only references to table "T1," so information from table "T2" of target child node 216-2 is not needed. Then, optimizer 116 may prune nodes 214-2 and 216-2 to generate query processing plan 204-3. Query processing plan 204-3 may represent a query processing plan that has been optimized based on join cardinality. In this example, each join operation has been pruned and only nodes 210-3 and 218-3 remain.

Figure 3:
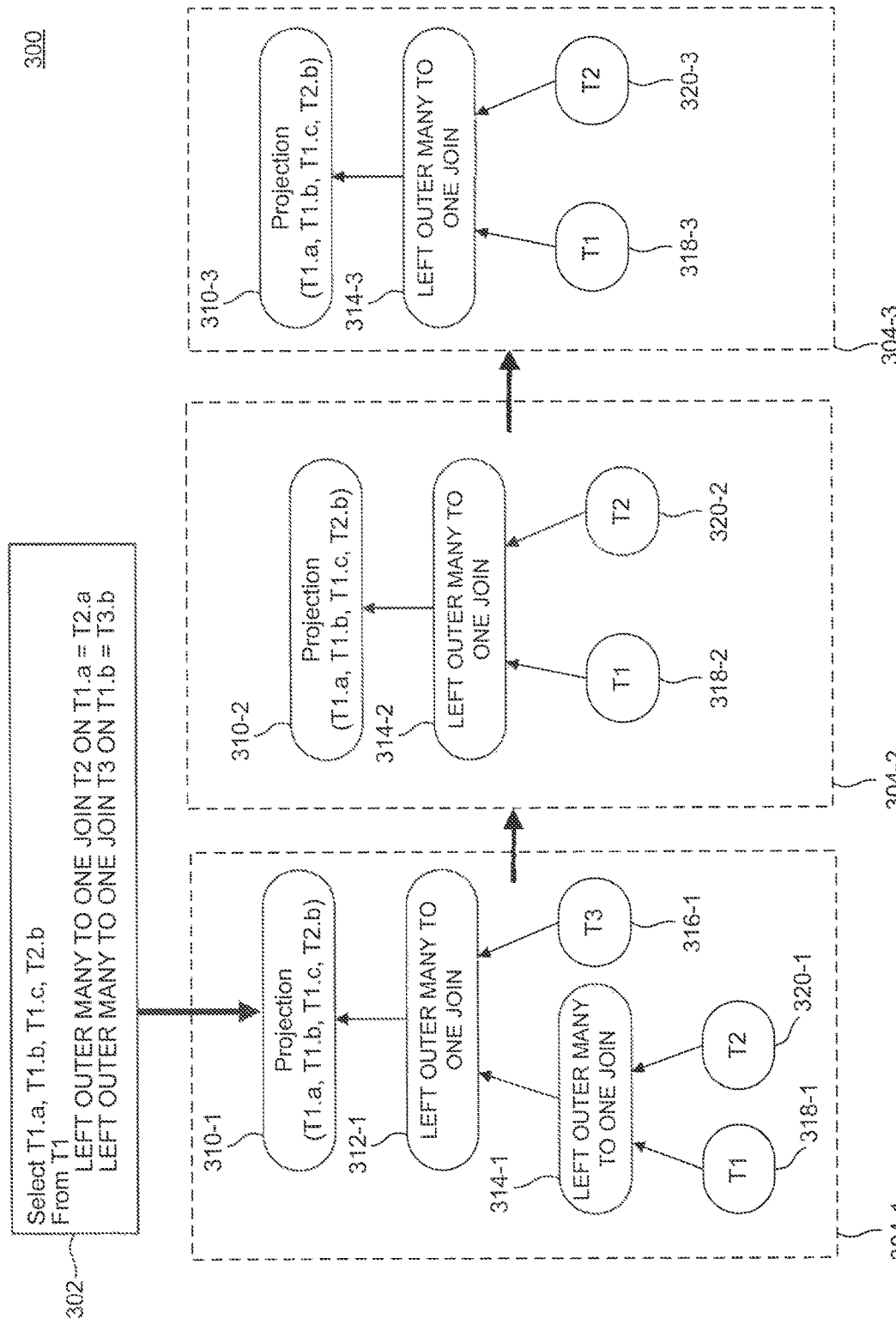
FIG. 3 is a diagram illustrating intermediate join optimization results for an example query, according to an example embodiment.

FIG. 3 is a diagram 300 illustrating intermediate join optimization results for an example query 302, according to an example embodiment. Similarly to FIG. 2, parser 112 may receive query 302 and generate a parse tree for representing query 302. As shown in diagram 300, query 302 differs from query 202 at least because the projection of query 302 refers to columns of tables "T1" and "T2."

Database engine 110 may generate query processing plan 304-1 based on query 302 and parse information. In an embodiment, optimizer 116 may determine whether each join operation node tagged with cardinality information may be optimized. Each query processing plan 304-*n*+1 succeeding query processing plan 304-*n* may depict a join optimization result after optimizer 116 has attempted to perform join optimization on a join operation node.

In query processing plan 304-1, optimizer 116 may determine node 312-1 to be a first join operation node to optimize. Like the optimization process described with respect to FIG. 2, optimizer 116 may compare the type of join operation, "LEFT OUTER JOIN," and its cardinality tag, "MANY TO ONE," with the optimization criteria depicted in FIG. 4 to determine a target child node that may possibly be pruned. In this instance, the target child node is the right child node, i.e., node 316-1, of node 312-1. Since table "T3" of target child node 316-1 is not accessed by any ancestor node of the child node's parent node, i.e., the join operation node 312-1, to produce a result of query 302, optimizer 116 may prune nodes 312-1 and 316-1 to produce query processing plan 304-2.

In query processing plan 304-1, optimizer 116 may determine node 314-2 to be a next remaining join operation node to optimize. Since the type of join operation and cardinality tag are the same as that of node 312-1, optimizer 116 may again determine that the target child node to be a right child node of join operation node 314-2. The right child node 320-2, is associated with or provides information from table "T2." But, at least one ancestor node of join operation node 314-2, the target child node 320-2's parent node, requires access to table "T2" to provide a result of the query. Specifically, the root node 310-2 contains a projection that refers to columns of table "T1" and "T2." Therefore, optimizer 116 cannot prune join operation node 314-2 and target child node 320-2. Query processing plan 304-3 depicts a result of performing join optimization on join operation node 314-2. As shown, query processing plan 304-3 is equivalent to query processing plan 304-2. In an embodiment, query processing plan 304-3 may represent a query processing plan that has been optimized based on join cardinality because no other un-optimized join operation nodes remain.

Figure 5:
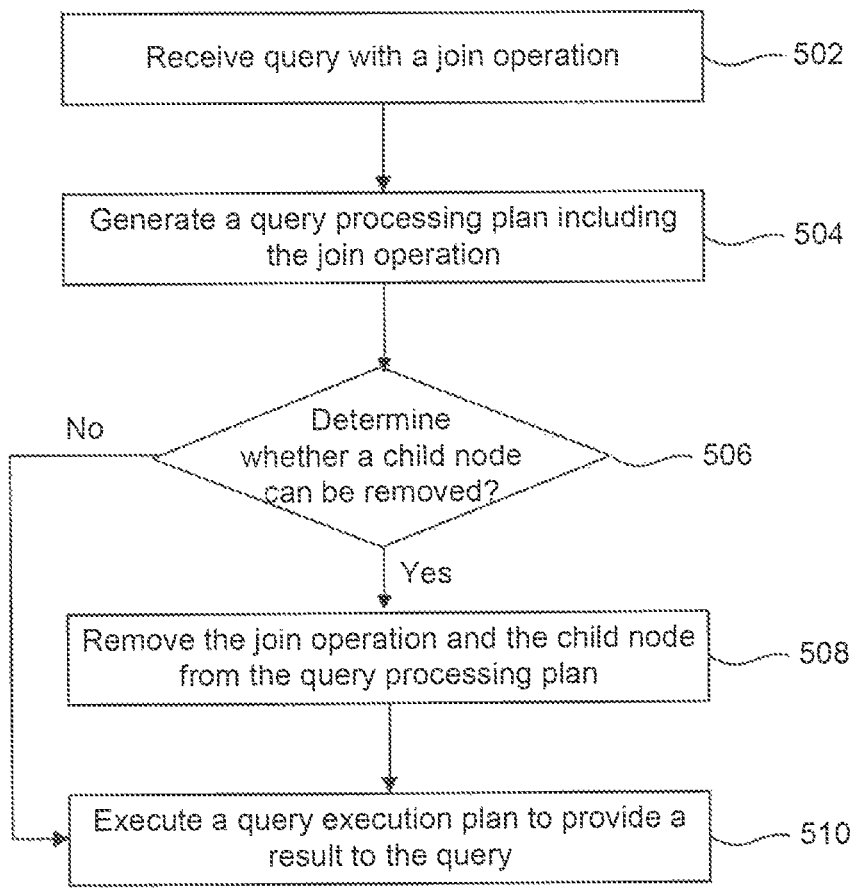
FIG. 5 is a flowchart illustrating a method for improving the performance of join queries using join cardinality information, according to an example embodiment.

FIG. 5 is a flowchart of a method 500 for improving the performance of join queries using join cardinality information, according to an embodiment. Method 500 can be performed by processing logic that can comprise hardware (e.g., circuitry, dedicated logic, programmable logic, microcode, etc.), software (e.g., instructions executing on a processing device), or a combination thereof.

In step 502, a parser of a database engine receives a query having a join operation combining a left table and a right table. The join operation typically may be specified by a join type, e.g., "INNER JOIN" or "RIGHT OUTER JOIN," that is tagged with cardinality information. For example, a cardinality tag may be "ONE TO ONE" or "MANY TO EXACT ONE." In an embodiment, the parser may be, for example, parser 112 from DBMS 106 of FIG. 1. As discussed, the parser may check the syntax of the received query and generate a relational data structure, such as a parse tree. In an embodiment, a checker, such as checker 114 of FIG. 1, may perform semantic analysis of nodes within the parse tree to link nodes to specific objects within database storage 108. The checker may modify the parse tree to include analyzed semantic information.

In step 504, a database engine generates a query processing plan including the join operation. In an embodiment, the database engine may be database engine 110 from DBMS 106 of FIG. 1. An optimizer, such as optimizer 116 of FIG. 1, may generate the query processing plan based on a received parse tree or modified parse tree of step 502.

In an embodiment, steps 506 and 508 may encompass steps for improving performance of a query by optimizing a join operation of the query using a cardinality tag of the join operation. In an embodiment, the optimizer may determine whether this join optimization may be applicable based on whether the join operation is tagged with cardinality information. In an embodiment to be described with respect to FIG. 6, steps 610-614 illustrate more detailed steps for performing optimization of a join operation.

In step 506, the optimizer determines, from the query processing plan, whether a child node of the join operation node can be removed without affecting a result of the received query. As described here, the child node may be selected from the left table or the right table. In an embodiment and further described with respect to FIG. 6, the optimizer may compare a type of the join operation and parts of the cardinality tag with stored or pre-configured optimization criteria to determine a child node that can be removed. If the optimizer determines that neither the left nor the right child node can be removed, method 500 proceeds to step 510. In this example, although no join optimization using cardinality information was possible, other query optimization processes may be performed to generate the query execution plan of step 510.

In step 508, if the optimizer determines and selects a child node, such as the left table, that can be removed, then the optimizer removes the join operation and the child node from the query processing plan. In an embodiment, the optimizer may use the pruned query processing plan to generate a query execution plan, which represents a query processing plan having optimized join operations.

In step 510, an executer of the database engine, such as executer 118 from FIG. 1, executes or performs the query execution plan to provide a result to the query. The database engine may return the query result to a client, such as client 102 of FIG. 1, that issued the query request. In an embodiment,?

Figure 6:
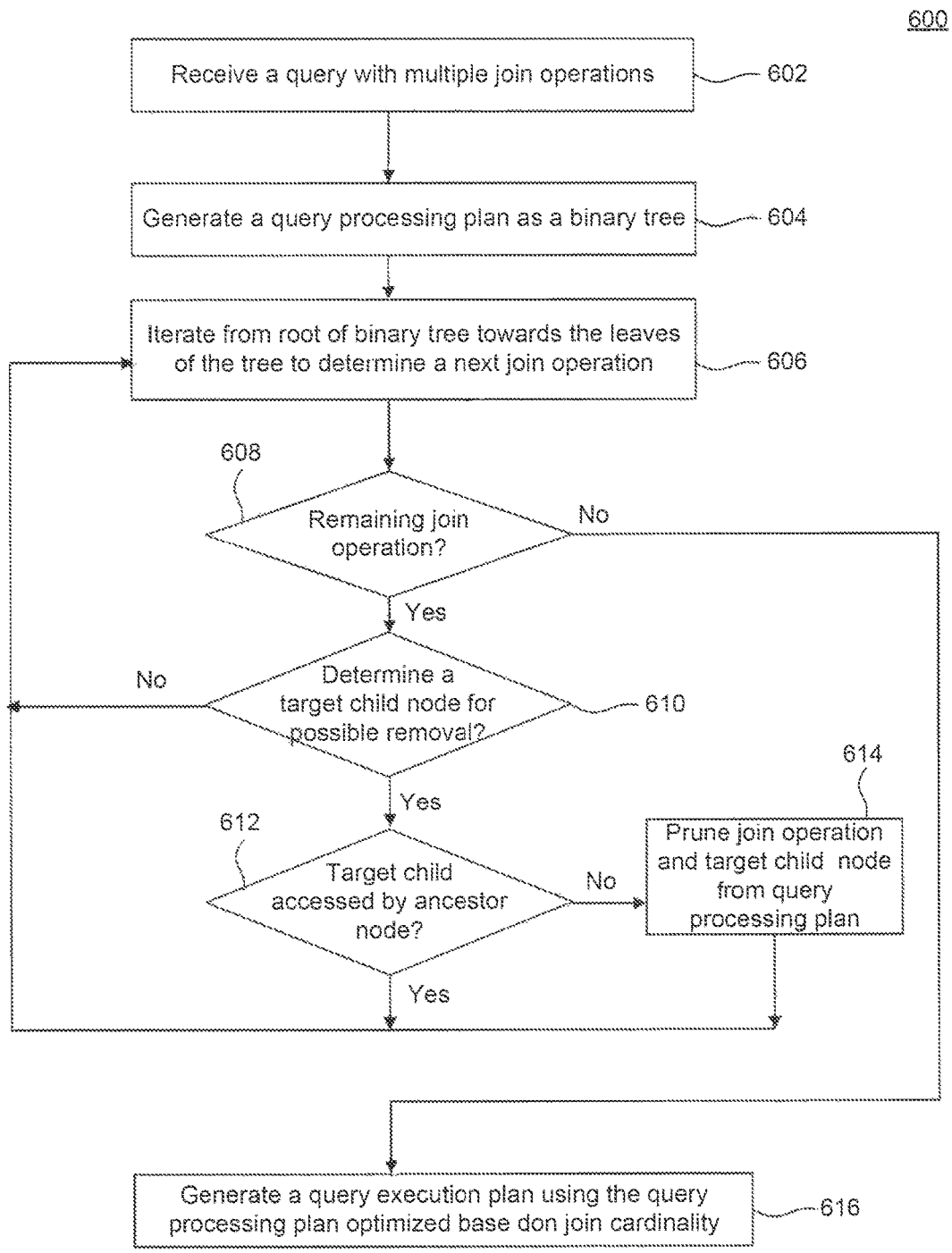
FIG. 6 is a flowchart illustrating a method for improving the performance of queries with multiple join operations using join cardinality information, according to an embodiment.

FIG. 6 is a flowchart of a method 600 for improving the performance of queries with multiple join operations using join cardinality information, according to an embodiment. Method 600 can be performed by processing logic that can comprise hardware (e.g., circuitry, dedicated logic, programmable logic, microcode, etc.), software (e.g., instructions executing on a processing device), or a combination thereof.

In step 602, a parser of a database engine, such as parser 112 of FIG. 1, receives a query having multiple join operations. Each join operation may be tagged with cardinality information. Similarly to step 502, the parser may parse the query for syntax correctness and generate a parse tree. Also, a checker, such as checker 114 of FIG. 1, may check semantics of the parse tree and associate each node of the parse tree with any corresponding information from database storage 108.

In step 604, the database engine, such as database engine 110 of FIG. 1, may use the parse tree to generate a query processing plan representative of logical steps to compute a result of the query. An example query processing plan may be a binary tree, such as query processing plan 204-1 of FIG. 2, having multiple nodes representing a corresponding join operation of the query. Similar to step 504, an optimizer, such as optimizer 116 of FIG. 1, may generate the query processing plan.

In step 606, the optimizer iterates from the root of the binary tree towards the leaves of the binary tree to determine a next join operation to possibly optimize. This iterative approach may represent a top-down approach where the optimizer prioritizes join operation nodes that are closer to the root in its join optimization determination. In an embodiment, a top-down approach is efficient because a child node that is pruned may include additional join operations. Therefore, performing join optimization on one join operation node may effectively reduce the number of join optimization determinations that need to be performed.

In an embodiment, pruning a target child node and its parent join operation node may also increase the number of join optimizations that may be performed on the non-pruned child node of the parent join operation node. This is because pruning the parent join operation node may remove references to the non-pruned child node (e.g., tables referenced in the join predicate of the parent join operation node.)

In step 608, if there are no more remaining join operation nodes that may possibly be optimized, method 600 proceeds to step 616. Otherwise, method 600 proceeds to step 610.

In step 610, for the current join operation node to be possibly optimized, the optimizer determines a target child node for possible removal. In an embodiment, to determine a target child node, the optimizer may implement logic for comparing a type of the current join operation node and its cardinality tag with the optimization criteria depicted in table 400 of FIG. 4. If the optimization criteria is not met, i.e., the combination of the type of the join operation and the cardinality tag is not valid, method 600 proceeds back to step 606 where the optimizer determines a next join operation node to be possibly optimized. In an embodiment, the optimizer may determine that any or either of the left and right nodes may be a target child node that may possibly be removed. For example, FIG. 4 shows that a target child for the join operation, "INNER JOIN" tagged by "EXACT ONE TO EXACT ONE" returns "any child" as the target child.

In step 612, when a target child node was determined in step 610, the optimizer determines whether the target child is accessed by any ancestor node of the join operation node to produce a result of the query. The optimizer effectively verifies that the target child node and the join operation node may be removed from the query without changing the result of the query. In an embodiment, the optimizer may traverse the query processing plan from the target child node's parent, the join operation node, to the root node to verify that the child node is not needed to produce a result of the query.

For example, if node 216-1 of FIG. 2 is the target child node, the optimizer traverses through the query processing plan 204-1 from node 210-1 until the root node, node 210-1. As shown, the root node includes a projection representing column data to be examined to produce a result of the query. Since the projection includes only columns from table "T1," table "T3" of target child node 216-1 will not be accessed. Therefore, in this example, method 600 proceeds to step 614. Otherwise, for example, when the projection references a table from the target child node or any of its descendent nodes, method 600 instead proceeds back to step 606.

In an embodiment, when the target child determined in step 610 may be either the left child node or the right child node, the optimizer may arbitrarily pick the left or the right node as the target child node. In an embodiment, other child node attributes, such as height of the child node, may be used to determine the target child node. In either case, if the optimizer determines that the target child may need to be accessed by an ancestor node to produce a query result, the optimizer may re-perform step 610 using the other child node as the target node.

In step 614, the optimizer prunes the join operation and the target child node from the query processing plan. The pruned query processing plan may represent a simplified query processing plan with optimized join operations. Method 600 proceeds back to step 606.

In step 616, the optimizer generates a query execution plan using the query processing plan optimized based on join cardinality. The optimizer may perform other types of query optimizations in order to improve the performance of the query processing plan. The query execution plan may be representative of least-cost query processing plan selected by the optimizer. Subsequently, an executer, such as executer 118 of FIG. 1, may perform the query execution plan to produce a result of the query. Then, the database engine may return the result to a client, such as client 102, that issued the query request.

Figure 7:
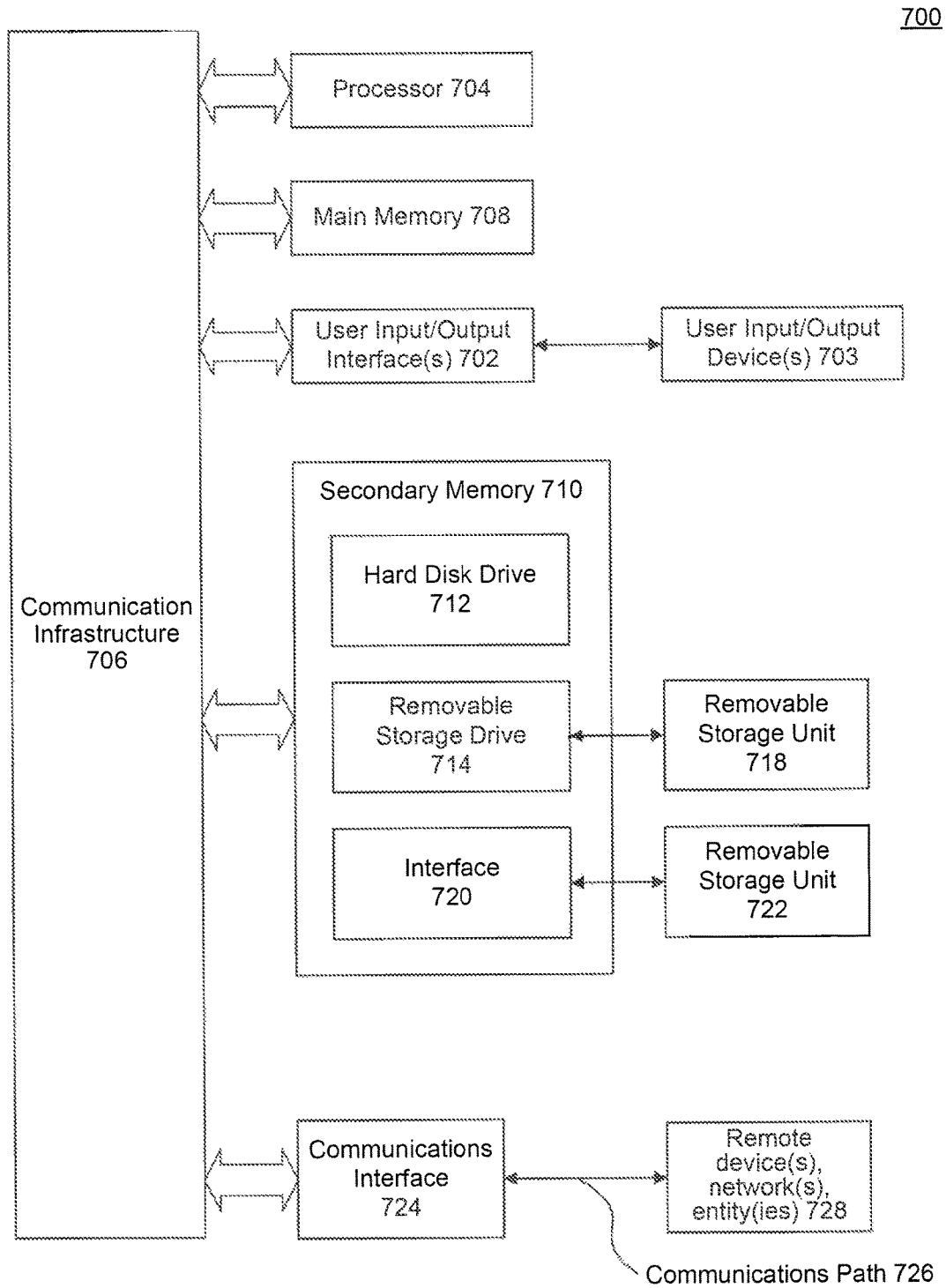
FIG. 7 depicts an example computer system useful for implementing various embodiments.

Various embodiments can be implemented, for example, using one or more well-known computer systems, such as computer system 700 shown in FIG. 7. Computer system 700 can be any well-known computer capable of performing the functions described herein.

Computer system 700 includes one or more processors (also called central processing units, or CPUs), such as a processor 704. Processor 704 is connected to a communication infrastructure or bus 706.

One or more processors 704 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 also includes user input/output device(s) 703, such as monitors, keyboards, pointing devices, etc., that communicate with communication infrastructure 706 through user input/output interface(s) 702.

Computer system 700 also includes a main or primary memory 708, such as random access memory (RAM). Main memory 708 may include one or more levels of cache. Main memory 708 has stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 reads from and/or writes to removable storage unit 718 in a well-known manner.

According to an exemplary embodiment, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may include any combination of LANs, WANs, the Internet, etc. Control logic and/or data may be transmitted to and from computer system 700 via communication path 726.

In an embodiment, a tangible apparatus or article of manufacture comprising a tangible computer useable or readable medium having control logic (software) stored thereon is also referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 7. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A computer-implemented method, comprising:
receiving a query including a join operation on a first and a second table using a join predicate, and a tag for the join operation indicating a cardinality relationship between the first and the second table when satisfying the join predicate;
generating a query processing plan for performing the query;
selecting, based on a type of the join operation and the tag, one of the first or the second tables to remove from the join operation; and
removing, based on the selecting, the join operation and the selected table from the query processing plan,
wherein at least one of the receiving, generating, removing, and verifying are performed by one or more computers.

2. The method of claim 1, wherein the first table is representative of one of a table stored in a database, a joined table created from joining the first table with a second table in the database, or a second joined table created from joining the first joined table with a third table in the database.

3. The method of claim 1, herein the tag includes a first part and a second part, wherein the first part indicates a cardinality of the first table with respect to the second table, and wherein the second part indicates a cardinality of the second table with respect to the first table.

4. The method of claim 1, wherein the selecting comprises:
comparing the type of the join operation and the tag with programmed optimization criteria to determine the selected table.

5. The method of claim 4, wherein the selecting further comprises:
using a projection of the query processing plan to verify that the selected table can be removed without affecting a result produced by the query processing plan.

6. The method of claim 1, wherein the query processing plan is represented as a relational binary tree having a projection in a root node and the join operation in an internal node that is parent to a first and a second child node respectively corresponding to the first and second table, and wherein the removing comprises:
pruning, from the query processing plan, the internal node and a third child node corresponding to the selected table, wherein the third child node is one of the first and the second child nodes.

7. The method of claim 6, wherein the verifying comprises:
traversing from a parent of the internal node to the root node to check that no ancestor node of the internal node accesses data from the third child node to produce the result of the query.

8. The method of claim 1, wherein the query includes a plurality of join operations, wherein the query processing plan is represented as a relational binary tree having a root node containing a projection of the query and having a plurality of internal nodes, each internal node corresponding to a respective join operation of the query, and wherein the method further comprises:
determining whether each join operation and a corresponding internal node can be pruned from the binary tree without affecting a result produced by the query processing plan; and
prioritizing the determining for join operations that are closer to the root node.

9. A system, comprising:
a memory; and
at least one processor coupled to the memory and configured to:
receive a query including a join operation on a first and a second table using a join predicate, and a tag for the join operation indicating a cardinality relationship between the first and the second table when satisfying the join predicate;

generate a query processing plan for performing the query;

select, based on a type of the join operation and the tag, one of the first or the second tables to remove from the join operation, and remove, based on the selecting, the join operation and the selected table from the query processing plan.

10. The system of claim 9, wherein the first table is representative of one of a table stored in a database, a joined table created from joining the first table with a second table in the database, or a second joined table created from joining the first joined table h a third table in the database.

11. The system of claim 9, wherein the tag includes a first part and a second part, wherein the first part indicates a cardinality of the first table with respect to the second table, and wherein the second part indicates a cardinality of the second table with respect to the first table.

12. The system of claim 9, wherein to select the at least one processor is further configured to:

compare the type of the join operation and the tag with programmed optimization criteria to determine the selected table.

13. The system of claim 12, wherein to select the at least one processor is further configured to:

using a projection of the query processing plan to verify that the selected table can be removed without affecting a result produced by the query processing plan.

14. The system of claim 9, wherein the query processing plan is represented as a relational binary tree having a projection in a root node and the join operation in an internal node that is parent to a first and a second child node respectively corresponding to the first and second table, and wherein to remove the at least one processor is further configured to:

prune, from the query processing plan, the internal node and a third child node corresponding to the selected table, wherein the third child node is one of the first and the second child nodes.

15. The system of claim 14, wherein to verify the at least one processor is further configured to:

traverse from a parent of the internal node to the root node to check that no ancestor node of the internal node accesses data from the third child node to produce the result of the query.

16. The system of claim 9, wherein the query includes a plurality of join operations, wherein the query processing plan is represented as a relational binary tree having a root node containing a projection of the query and having a plurality of internal nodes, each internal node corresponding to a respective join operation of the query, and wherein the at least one processor is further configured to:

determine whether each join operation and a corresponding internal node can be pruned from the binary tree without affecting a result produced by the query processing plan; and prioritize the determining for join operations that are closer to the root node.

17. A tangible computer-readable device having instructions stored thereon that, when executed by at least one computing device, causes the at least one computing device to perform operations comprising:

receiving a query including a join operation on a first and a second table using a join predicate, and a tag for the join operation indicating a cardinality relationship between the first and the second table when satisfying the join predicate;

generating a query processing plan for performing the query;

selecting, based on a type of the join operation and the tag, one of the first or the second tables to remove from the join operation; and removing, based on the selecting, the join operation and the selected table from the query processing plan, wherein at least one of the receiving, generating, removing, and verifying are performed by one or more computers.

18. The computer-readable device of claim 15, wherein the selecting comprises:

comparing the type of the join operation and the tag with programmed optimization criteria to determine the selected table; and using a projection of the query processing plan to verify that the selected table can be removed without affecting a result produced by the query processing plan.

19. The computer-readable device of claim 17, wherein the query processing plan is represented as a relational binary tree having a projection in a root node and the join operation in an internal node that is parent to a first and a second child node respectively corresponding to the first and second table, and wherein the removing comprises:

pruning, from the query processing plan, the internal node and a third child node corresponding to the selected table, wherein the third child node is one of the first and the second child nodes.

20. The computer-readable device of claim 17, wherein the query includes a plurality of join operations, wherein the query processing plan is represented as a relational binary tree having a root node containing a projection of the query and having a plurality of internal nodes, each internal node corresponding to a respective join operation of the query, and wherein the operations further comprise:

determining whether each join operation and a corresponding internal node can be pruned from the binary tree without affecting a result produced by the query processing plan; and prioritizing the determining for join operations that are closer to the root node.

* * * * *